United States

Graham et al.

[11] 3,807,833

[5] Apr. 30, 1974

[54] ELECTRO-OPTIC CELL HAVING A LIQUID ISOLATED FROM ITS HERMETIC SEALING MEANS

[75] Inventors: George A. Graham, Levittown, Pa.; Nunzio A. Luce, Trenton; Louis A. Zanoni, Mercerville, both of N.J.

[73] Assignee: Optel Corporation, Princeton, N.J.

[22] Filed: Jan. 18, 1973

[21] Appl. No.: 324,822

Related U.S. Application Data

[63] Continuation of Ser. No. 193,745, Oct. 29, 1971, abandoned.

[52] U.S. Cl. ........ 350/160 LC, 29/25.11, 29/25.13, 29/25.16, 29/471.1, 29/471.7, 29/471.9, 29/472.9, 29/501
[51] Int. Cl. ............................................. G02f 1/16
[58] Field of Search ................... 350/160 LC, 160 R

[56] References Cited
UNITED STATES PATENTS

| | | | |
|---|---|---|---|
| 3,614,210 | 10/1971 | Caplan | 350/160 LC X |
| 3,657,928 | 4/1972 | Melamed | 350/160 LC X |
| 3,674,341 | 7/1972 | Hedman, Jr. et al. | 350/160 LC |
| 3,675,989 | 7/1972 | Pietsch et al. | 350/160 LC |
| 3,689,131 | 9/1972 | Klein et al. | 350/160 LC |

*Primary Examiner*—Edward S. Bauer
*Attorney, Agent, or Firm*—Joel F. Spivak

[57] ABSTRACT

A liquid crystal cell comprises a transparent top support plate having a transparent conductive coating thereon, a bottom support plate smaller than the first support plate and having a reflective conductive coating on one surface thereof and a black coating on its opposite surface is centered with respect to and spaced from the top support plate, a layer of a liquid crystal composition fills the space between the support plates, a metal cover encloses the bottom support plate and liquid crystal layer and is sealed around its periphery to the top support plate by means of a metal frit and solder. The cover is insulated from the top support plate by means of a dielectric insulating layer on the support plate. Spring means are provided which are bonded to the cover and the bottom support plate for holding the bottom support plate in position. A method for assembling the structure is described.

12 Claims, 5 Drawing Figures

INVENTORS;
NUNZIO A. LUCE
LOUIS A. ZANONI &
GEORGE A. GRAHAM

ELECTRO-OPTIC CELL HAVING A LIQUID CRYSTAL MATERIAL ISOLATED FROM ITS HERMETIC SEALING MEANS

This is a continuation of application Ser. No. 193,745, filed 10/29/71 and now abandoned.

BACKGROUND OF THE INVENTION

This invention relates to an electro-optic liquid device structure and particularly to a liquid crystal device useful for displays such as numeric and alpha-numeric indicators.

Prior to the invention described herein, liquid crystal structures consisted essentially of a sandwich structure consisting of first and second support plates having conductive coatings thereon and a liquid crystal layer sandwiched therebetween. This structure was sealed by means of either a glass frit or a sealant such as an epoxy cement around its periphery so as to bond the support plates together. With such a structure, the liquid crystal material had to be inserted after the device was sealed and the liquid crystal material was generally in contact with the sealant which was often a source of contamination. These devices were difficult to fill and the seal was difficult to maintain over wide temperature ranges. For example, filling techniques comprised first sealing the support plates to each other and then injecting or sucking the liquid crystal material into the device through holes or grooves in the device and then closing these holes or grooves. Such techniques are difficult to work with, often result in bubbles in the liquid crystal layer and are not compatable for commercial production. The novel device structure allows the liquid crystal material to be inserted in the device by a simple drop application prior to sealing of the device without adverse effects of heat applied during sealing and while keeping the liquid crystal layer separated from the sealant.

SUMMARY OF THE INVENTION

A liquid crystal device comprises:
a. a first transparent support plate having a transparent conductive coating thereon;
b. a second support plate having a reflective conductive surface thereon;
c. a liquid crystal layer between said support plates adjacent said conductive coatings of said support plates;
d. a cover enclosing said second support plate and said liquid crystal layer, said cover being insulated from and sealed to said first transparent support plate by hermetic sealing means.

DETAILED DESCRIPTION OF THE INVENTION

In general terms the novel device comprises a top transparent support plate having a transparent electrically conductive coating on a surface thereof, a bottom support plate having a specularly reflecting electrically conductive surface thereon spaced from the top support plate by spacer means. The bottom support plate is smaller than the top support plate in both length and width and is centered thereunder with the respective conductive surfaces of the support plates facing each other. An active electro-optic layer, such as a ¼ to ½ mil thick liquid crystal layer, fills the space between the support plates. Electrical connection access means are provided on at least one of the support plates for aiding in making connections to external electrical driving circuitry and power supplies. A cover completely encloses and is preferably spaced from the bottom support plate and the liquid crystal layer, said cover being sealed to an electrically insulated from said top support plate so as to hermetically seal the liquid crystal layer within the cover. As will be shown later, this structure allows for simple device fabrication and obviates the need to seal the bottom and top support plates to each other.

Referring now to FIGS. 1–5 there is shown a preferred novel liquid crystal device structure embodying the invention. This embodiment is particularly useful in numeric or alpha-numeric displays for instruments such as watches, clocks and calculators.

Figure 1:
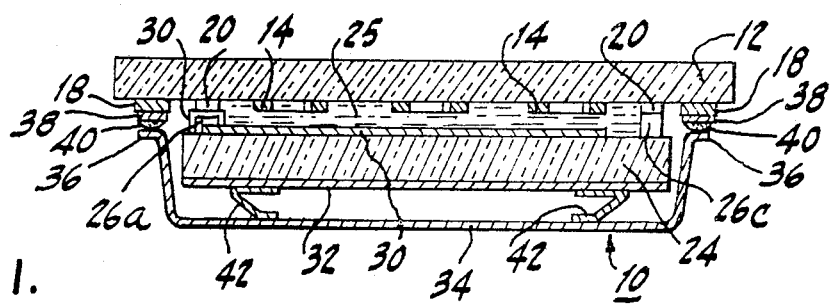
FIG. 1 is a side cross-sectional view of a novel structure embodying the invention.

The assembled numeric device 10 shown in FIG. 1 comprises a top transparent support plate 12, typically made of glass, having a patterned conductive coating 14 thereon. For illustrative purposes the pattern shown consists of three, seven segment digits. The conductive coating 14 may be formed for example, from tin oxide, indium oxide or gold by any of the techniques well known in the art.

Figure 2:
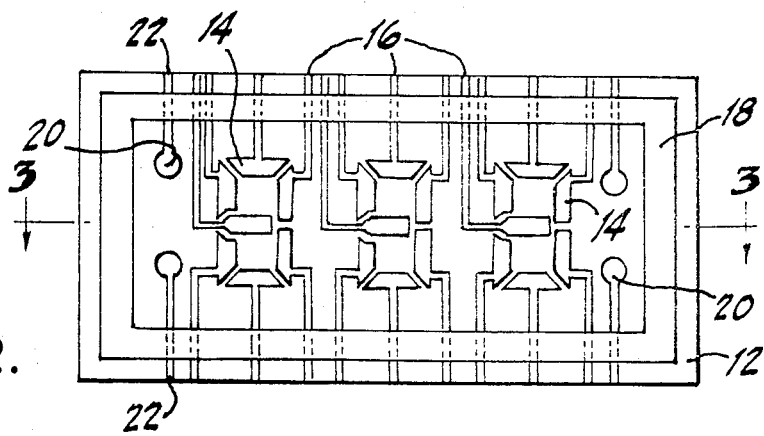
FIG. 2 is a plan view of the bottom of the top support plate of the device of FIG. 1.
Figure 3:
FIG. 3 is a side cross sectional view of the top support plate taken through 3—3.
Figure 4:
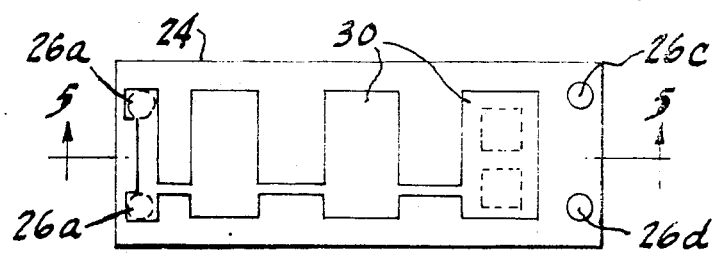
FIG. 4 is a plan view of the bottom support plate of the device of FIG. 1.
Figure 5:
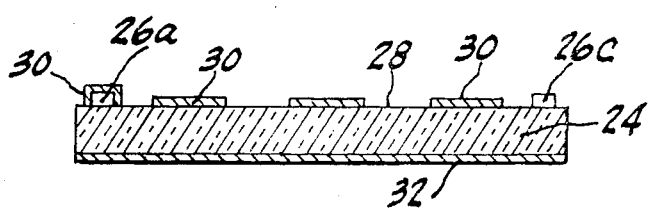
FIG. 5 is a cross sectional view of the bottom support plate taken through 5—5 of FIG. 4.

As can better be seen with reference to FIG. 2, each segment of the transparent conductive coating 14 is provided with a conductive extention lead 16 which extends to an edge of the top support plate 12 so as to provide means for electrical access to the device. A thin dielectric insulating layer 18 extends in a band around the top support plate 12 to form a closed indented border separated from and around the conductive segments 14. The dielectric layer 18 provides electrical insulation over the portion of the conductive extension leads 16 where the seal is to be made.

We have discovered that a dark colored dielectric layer 18 is advantageous in that the apparent contrast of the display is improved as compared with devices using a colorless or lightly colored dielectric layer. It is believed that the dark border keeps the eye of the viewer focused on the numeric display portion of the device when in operation. A suitable dielectric layer can be formed, for example, from DuPont 8j85, Owens-Illinois Sg67 or Electroscience 4770 dielectric materials.

The top support plate 12 includes isolated conductive pads 20 separated from the segmented conductors 14. The pads 20 have conductive access leads 22 extending therefrom to an edge of the support plate 12. The conductive pads 20 provide electrical access to conductive surfaces of the bottom support plate 24 as will be mor fully explained below.

As indicated, the device 10 includes a bottom support plate 24 spaced from the top support plate 12 and a liquid crystal layer 25 filling the space between the support plates 12 and 24. The bottom support plate 24 is smaller than the portion of the top support plate 12 which is enclosed by the dielectric layer 18. Although the bottom support plate is typically glass, it can be made of any rigid material which is inert to the liquid crystal layer and which has or can be provided with a specularly reflecting surface, including metal. As shown in the Figures, the bottom support plate 24 is provided with spacer means, 26a-26d, thereon. The preferred spacer means 26a-26d comprises a plurality of dielectric islands fused or otherwise bonded to the top surface 28 of the bottom support plate 24. These islands can be formed of any dielectric mater inert to the liquid crystal layer. The thickness of the spacers determines the thickness of the liquid crystal layer and all spacers should be of the same thickness. The four spacers shown are positioned adjacent the corners of the bottom support plate so as not to overlie the segmented conductors of the top support plate in the assemble device.

A patterned specularly reflective conductive coating 30 which may be formed for example by vacuum evaporation of a metal, is provided over the top surface 28 of the bottom support plate 24 and extends over the dielectric islands 26a and 26b. For purposes of illustration the reflective pattern is shown to consist of three interconnected rectangular conductive layers positioned to lie opposite the respective segmented transparent conductors 14 of the top support plate 12. The reflective conductive coating 30 is made to extend over the dielectric spacers 26a and 26b. The dielectric spacers are positioned such that in the assembled device shown in FIG. 1, the reflective conductive layer on the spacers 26a and 26b abut and makes electrical contact with the conductive pads 20 on the top support plate 12 thereby providing electrical access to the conductive coating 30 of the bottom support plate 24.

While the reflective coating 30 is shown here as being in an interconnected pattern, it is obvious that if desired any of the reflective rectangles could be isolated from the others and separate connections could be made for each to separate corresponding conductive pads provided on the top support plate. In addition, the reflective coating can be in a different shape, for example they may be in the form of figure eights which lie opposite the corresponding segmented figure eight of the top support plate.

In order to increase the contrast ratio of the display the bottom support plate 24 is provided with a dark background in the areas outside the reflective coating. This is preferably done by providing a black coating 32 on the entire underside of the bottom support plate 24. Any black coating material, such as lacquer or paint, is suitable.

The sandwich formed by the top support plate 12, the liquid crystal layer 25 and the bottom support plate 24, is hermetically sealed by sealing a metal cover 34 to the top support plate 12 in the region over the dielectric insulator layer 18. The metal cover 34 can be formed from any solderable metal having a temperature coefficient of expansion close to that of the support plate to which it is sealed. Suitable metal include Kovar and Sylvania 4.

The metal cover completely encloses and is spaced from the bottom support plate 24 and the liquid crystal layer 25, and is provided with a flanged outer surface 36 which is preferably pre-tinned to promote easy soldering. The preferred sealing means comprises a metal frit layer 38 and a low temperature solder layer 40. The metal frit layer 38 is placed on the dielectric insulator layer 18 in a band which is slightly narrower than the dielectric layer 18. Suitable frits include, for example, Cermalloy 4150 and DuPont 7553 metal frits. The low temperature solder layer 40 lies on the frit layer 38 and bonds the frit layer to the metal cover 34 around the entire flanged surface thereby hermetically sealing the liquid crystal layer 25 within the cover 34. A suitable solder is DuPont 8523 which has a composition 62 percent Sn, 36 percent Pb, 2.0 percent Ag.

It should be noted that while the structure can be sealed by other means, for example, by forming a glass to glass seal utilizing a glass dielectric placed both on the cover and the top support plate, the metal frit-solder seal is preferred since relatively low temperatures are needed to form the seal as compared with glass-glass seals and the seal is more durable than plastic type seals.

Another feature of the preferred embodiment is the incorporation of means 42 for preventing or minimizing movement of the bottom support plate 24 and for aiding in assembly of the device. As shown in FIG. 1, these means comprise a plurality of springs 42 mounted between the inside of the metal cover 34 and the bottom of the bottom support plate 24.

The novel structure differs from other liquid crystal devices in that the liquid is not in contact with the seal, the device can be sealed after it is filled with the liquid and the liquid can be inserted by simply dropping it on the support plate in an appropriate manner.

A typical process for fabricating the novel device comprises the steps of

1. Patterning the transparent conductive coating of the top support plate;
2. screening a suitably wide band of a dielectric insulator layer over the patterned conductive coating;
3. Screening on a metal frit over the dielectric layer in a width slightly less than the dielectric layer;
4. Firing the dielectric layer and metal frit either separately or together to bond these layers to each other and to the top support plate;
5. Screen on a layer of solder over the metal frit;
6. Screen on and fire the dielectric spacers onto the bottom support plate;
7. Apply the black coating to the back of the bottom support plate;
8. tin the flanged surface of the metal cover;
9. spot weld the springs into the metal cover;
10. invert the can, center the bottom support plate therein so that it rest on the springs and bond the springs to the surface of the bottom support plate having the black coating;
11. vacuum evaporate the reflective coating on the bottom support plate and appropriate spacers;
12. place the liquid crystal material onto the bottom support plate by simply applying an appropriate number of drops of liquid thereon;
13. align the top support plate having the sealing materials thereon over the bottom support plate and cover such that the respective patterns, conductors, conductive pads are in proper registry the lower the top support plate onto the metal cover while maintaining allignment so that the flange is in contact with the solder around its entire periphery. While holding the glass down in this manner, heat the cover to melt the solder and form the seal.

The bottom support plate rests on the spring such that when the top support plate is sealed in place it presses against the spacers on the bottom support plate and depresses the spring thereby creating a pressure which helps to insure good contact between the conductive pads and the reflective conductors overlying the spacers.

Since in operation of the device, light scattering is caused in regions between overlapping conductors of the top and bottom support plates, it is preferred that the conductive leads and the conductive pads be arranged such that there is no overlap in these regions.

What we claim is:

1. An electro-optic device comprising:
   a. a first transparent support plate having a transparent conductive coating on a surface thereof,
   b. a second support plate spaced from said first support plate and having a conductive reflective surface, at least one of said conductive coatings be patterned,
   c. an active liquid electro-optic layer filling the space between said support plates and adjacent said conductive surfaces of said support plates,
   d. a cover, said cover completely enclosing said second support plate and said liquid electro-optic layer, said cover being insulated from the transparent conductive coating of said first support plate, and
   e. hermetic sealing means for sealing said cover to said first support plate thereby sealing said second support plate and liquid layer within said cover, said sealing means being isolated from said liquid crystal layer.

2. The device recited in claim 1 including means adapted to hold said second support plate in place and minimize movement thereof.

3. The device recited in claim 2 wherein said holding means consists of spring means bonded to said cover and to said second support plate.

4. The device recited in claim 1 wherein said liquid electro-optic layer is a liquid crystal composition.

5. A liquid crystal device comprises
   a. a top transparent support plate having a patterned transparent conductive coating on the bottom surface thereof,
   b. a bottom support plate spaced from said top support plate by spacer means, said bottom support plate being smaller in size than said top support plate and centered thereunder,
   c. a reflective conductive coating on the top surface of said bottom support plate opposite the patterned transparent conductive coating of said top support plate,
   d. access means for making external electrical connections to said transparent conductive coating,
   e. access means for making external electrical connections to said reflective conductive coating,
   f. an electro-optic liquid crystal layer filling the space between the support plates,
   g. a metal cover, spaced from and completely enclosing said bottom support plate and said liquid crystal layer and said patterned transparent conductive coating, said cover being sealed around its entire edge to said top support plate by hermetic sealing means and being electrically insulated from said access means for making external electrical connections to said transparent conductive coating and isolated from said liquid-crystal layer,
   h. spring means for holding said bottom support plate in place.

6. The device recited in claim 5 wherein
   a. said transparent conductive coating is in the form of a segmented numeric pattern,
   b. said access means to said pattern consists of transparent conductive leads extending from said segments toward the edge of the top support plate at least beyond the area defined by the hermetic seal,
   c. said access means for making external electrical connections to said reflective conductive coating consists of, in combination, conductive pads on said top support plate having access leads extending therefrom and a conductive layer in contact with the reflective conductive coating on said bottom support plate, said conductive layer extending over said spacer means on said bottom support plate, said means being registered with said conductive pads such that the conductive layer is in contact therewith.

7. The device recited in claim 6 including a band of a dielectric insulating layer forming an indented border around the bottom surface of said top support plate, thereby insulating said metal cover from said conductive access leads on said top support plate and wherein said hermetic sealing means for sealing said metal cover to said top support plate comprises a metal frit layer on and bonded to said dielectric insulating layer and a layer of solder on and bonded to said metal frit layer said metal cover being soldered around its entire edge to said solder layer.

8. The device recited in claim 7 wherein said dielectric insulating layer is of a dark color.

9. The device recited in claim 6 including means for providing a dark background on said bottom support layer in regions outside of those opposite the segmented numeric patterns of said top support plate.

10. A liquid crystal electro-optic device comprises:
   a. a transparent top support plate,
   b. a transparent conductive coating on the bottom surface of said top support plate in the form of at least one segmented numeric pattern,
   c. transparent conductive access leads extending from each segment to an edge of said top support plate,
   d. conductive pads having conductive access leads extending therefrom to an edge of said top support plate, said conductive pads being isolated from said conductive segmented numeric pattern and access leads associated therewith,
   e. a dark colored dielectric insulating layer bonded to said top support plate in the form of a border therearound said border being indented at least from the edges of said support to which said transparent access leads extend, said insulating layer covering a portion of said access leads and enclosing said segmented numeric pattern within said border,
   f. a bottom support plate spaced from said top support plate by dielectric spacer means at least one of which is registered with said conductive pads,
   g. a patterned reflective conductive coating on the top surface of said bottom support plate, said pattern being registered with respect to said segmented numeric pattern, h. conductive access leads extending from said patterned reflective conductive coating and over said spacer means so as to contact said conductive pads, i. a liquid crystal layer filling the space between said top and bottom support plates and being isolated from said liquid crystal layer, j. a metal frit layer in the form of a border on and bonded to said dielectric border so as to be isolated from any conductive leads, k. a solder layer in the form of a border on and bounded to said metal frit layer, l. a solderable metal cover having a flanged edge which lies on and is soldered to said solder layer is spaced from and completely encapsulates and seals said bottom support plate and said liquid crystal layer, said bottom support plate being smaller than said top support plate so as to completely lie within the border formed by said metal frit layer but being larger than said segmented numeric pattern, and m. a plurality of spring members fastened to said metal can and said bottom support plate for holding said bottom support plate in position.

11. The device recited in claim 10 wherein said bottom support plate is transparent and including a dark coating on the bottom surface of said bottom support plate.

12. A process for fabricating a liquid crystal electrooptic device comprises the steps of:

a. forming a dielectric border layer indented from at least one edge of one support plate of said device.

b. forming a metal frit layer on said dielectric border, c. firing said dielectric border layer and said metal frit layers to bond said dielectric border layer to said support plate on one side and said metal frit layer on the other side thereof, d. forming a layer of solder on said metal frit layer, e. forming a plurality of dielctric spacers on a second support plate which second support plate is smaller than the area within said dielectric border, f. forming a reflective conductive coating pattern on one surface of said second support plate including conductive leads extending over at least one of said dielectric spacers, g. bonding a plurality of spring members to a solderable metal cover having a flanged edge, said flanged edge being of a size and shape so as to register with said solder layer on said first support plate, h. placing said second support plate in said metal cover and bond the surface thereof opposite the reflective coating to said spring members within said metal cover, i. holding the metal cover and second support plate in a horizontal position and applying several drops of a liquid crystal composition to said second support plate, j. lowering said first support plate over said second support plate in proper registry therewith and press so as to contact the solder layer with the flanged surface of said metal cover, while holding the top support in this position heat the metal can so as to solder the flanged area to the solder layer on the first support plate.

* * * * *